(12) United States Patent
Bellini et al.

(10) Patent No.: US 9,190,832 B2
(45) Date of Patent: Nov. 17, 2015

(54) CIRCUIT BREAKER FOR PROTECTING AN ELECTRICAL SYSTEM

(71) Applicant: GEFRAN S.p.A., Provaglio D'Iseo (IT)

(72) Inventors: Giorgio Bellini, Provaglio D'Iseo (IT); Ugo Claudani, Provaglio D'Iseo (IT)

(73) Assignee: GEFRAN S.P.A., Brescia (IT)

( * ) Notice: Subject to any disclaimer, the term of this patent is extended or adjusted under 35 U.S.C. 154(b) by 126 days.

(21) Appl. No.: 13/886,304

(22) Filed: May 3, 2013

(65) Prior Publication Data

US 2013/0293994 A1 Nov. 7, 2013

(30) Foreign Application Priority Data

May 4, 2012 (EP) .................................... 12425084

(51) Int. Cl.
*H02H 3/38* (2006.01)
*H01H 71/12* (2006.01)
*H01H 83/10* (2006.01)
*H02H 3/08* (2006.01)
*H02H 5/04* (2006.01)
*H02H 7/22* (2006.01)

(52) U.S. Cl.
CPC .............. *H02H 3/38* (2013.01); *H01H 71/123* (2013.01); *H01H 83/10* (2013.01); *H02H 3/085* (2013.01); *H02H 5/048* (2013.01); *H02H 7/222* (2013.01)

(58) Field of Classification Search
CPC ............. H02H 3/08; H02H 3/38; H02H 3/20; H02H 7/222; H01H 83/10
See application file for complete search history.

(56) References Cited

U.S. PATENT DOCUMENTS

| 4,112,748 | A | * | 9/1978 | Walley ....................... 73/114.59 |
| 4,209,817 | A | | 6/1980 | McGinnis |
| 4,441,281 | A | * | 4/1984 | Gordiski ............................ 451/5 |
| 5,305,174 | A | * | 4/1994 | Morita et al. .................... 361/63 |
| 5,689,395 | A | * | 11/1997 | Duffy et al. .................... 361/93.6 |
| 5,869,996 | A | * | 2/1999 | Okumura ....................... 327/512 |
| 6,717,785 | B2 | * | 4/2004 | Fukuda et al. ............... 361/93.1 |
| 7,304,870 | B2 | * | 12/2007 | Strijker et al. ............. 363/56.11 |
| 7,834,597 | B1 | * | 11/2010 | Shekhawat .................... 323/224 |
| 7,835,129 | B2 | * | 11/2010 | Thiele ........................... 361/103 |

FOREIGN PATENT DOCUMENTS

| FR | 2807580 A1 | 10/2001 |
| GB | 1490768 A | 11/1977 |

OTHER PUBLICATIONS

European Search Report from Application No. EP12 42 5084; prepared Oct. 4, 2012, in Munich, by Jacek Drabko.

* cited by examiner

*Primary Examiner* — Zeev V Kitov
(74) *Attorney, Agent, or Firm* — Thomas Horstemeyer, LLP

(57) ABSTRACT

The invention relates to a circuit breaker for protecting an electrical system. The circuit breaker comprises a semiconductor switching element (T1) with a first and a second electrical terminal connected to a mains supply line (LIN) and a control terminal. Such switching element (T1) is controlled by enabling/disabling a control signal (S) applied to the control terminal for switching between an open/closed status and a closed/open status for connecting/disconnecting at least one load (LD) to/from the supply line (LIN). Moreover, the circuit breaker comprises a drive (DV) adapted to enable/disable the control signal (S).

12 Claims, 2 Drawing Sheets

CIRCUIT BREAKER FOR PROTECTING AN ELECTRICAL SYSTEM

CROSS REFERENCE TO RELATED APPLICATIONS

This application claims the priority benefit of European Patent Application No. 12425084.6, filed on May, 4, 2012.

FIELD OF APPLICATION

The present invention relates to devices for protecting electrical system circuits for industrial use. In particular, the invention relates to a circuit breaker for protecting a system from failures that may occur on a mains supply line, on an electrical load or on the same breaker.

BACKGROUND

As known, in modern electrical systems designed for industrial use, safety devices are provided against failure or anomaly phenomena that may impair the correct system operation. In fact, without such safety devices, any anomalies and failures may damage both the utility equipment or "loads" present in the system and the same breakers, which connect/disconnect such loads from the system. In addition, hazard conditions may occur for the people that use such utility equipment.

An example of safety device for industrial electrical systems generally comprises a fuse associated with a thermal breaker. The thermal breaker is capable of disconnecting the load from a mains supply line of the system in case of overcurrent due to overload, while the fuse trips to protect the electrical system from short-circuit currents.

A drawback of such known safety device that uses the fuse is related to the need of resetting the safety following the occurrence of the short-circuit in the system, in particular by removing the faulty fuse to replace it with a new one. Such operation for replacing the fuse is often a burdensome manual activity that requires the assistance of a skilled operator.

Moreover, the breaker of the safety device with fuse is not exempt from damages that may be caused by transient phenomena that occur with short-circuits.

SUMMARY

The object of the present invention is to devise and provide a circuit breaker for protecting an electrical system, in particular for protecting a system for industrial use from failures such as, for example, short-circuit currents, having features that allow overcoming, at least partly, the limitations and/or the drawbacks of the known safety device mentioned above.

Such object is achieved by a circuit breaker according to claim 1. Preferred embodiments of such circuit breaker are defined by the dependent claims 2-13.

BRIEF DESCRIPTION OF DRAWINGS

Further features and advantages of the above circuit breaker for protecting an electrical system will appear more clearly from the following description of a preferred embodiment thereof, given by way of a non-limiting example with reference to the annexed figures, wherein.

DETAILED DESCRIPTION

Figure 1:
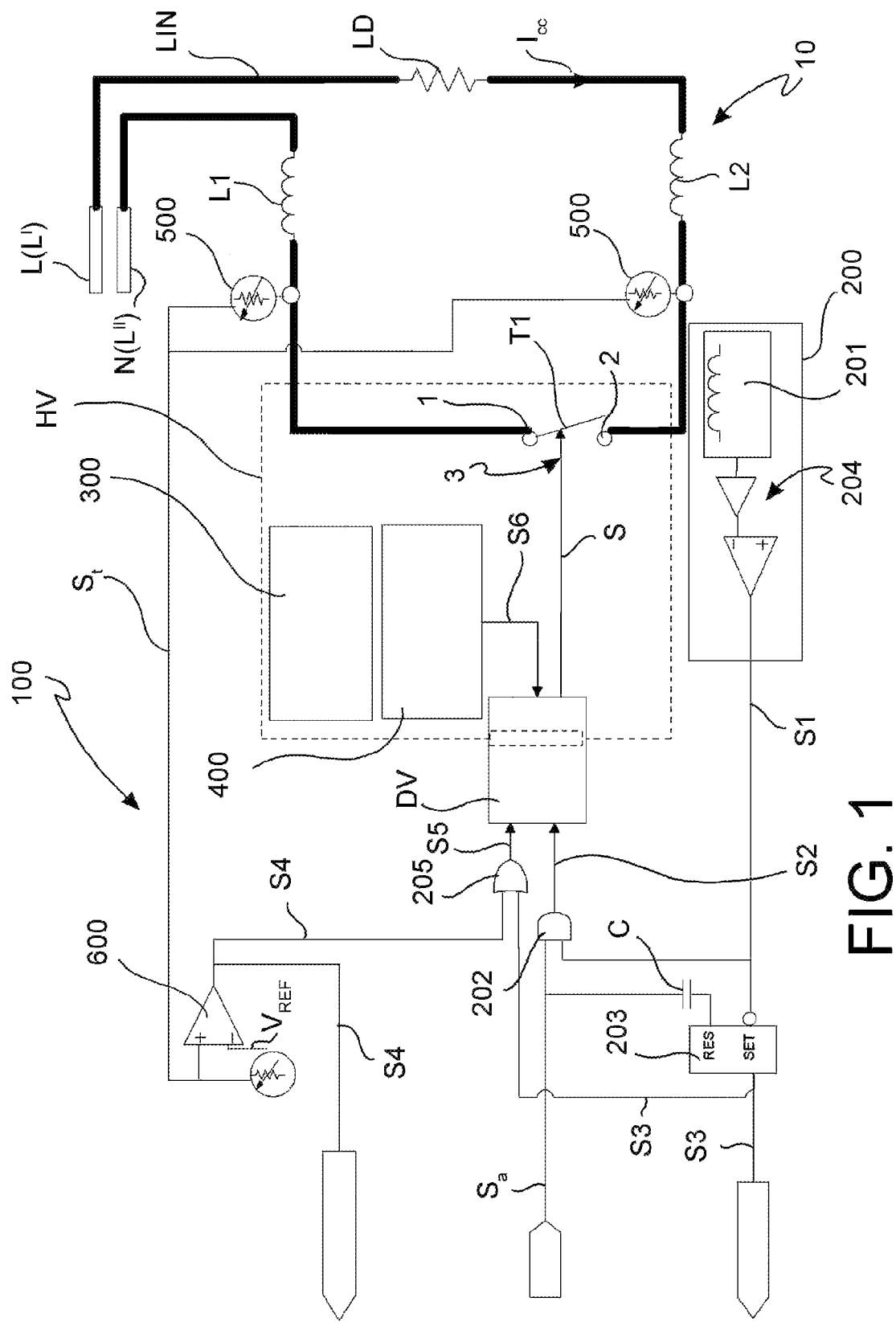
FIG. 1 shows a block diagram of an example of circuit breaker for protecting an electrical system according to the present invention.
Figure 2:
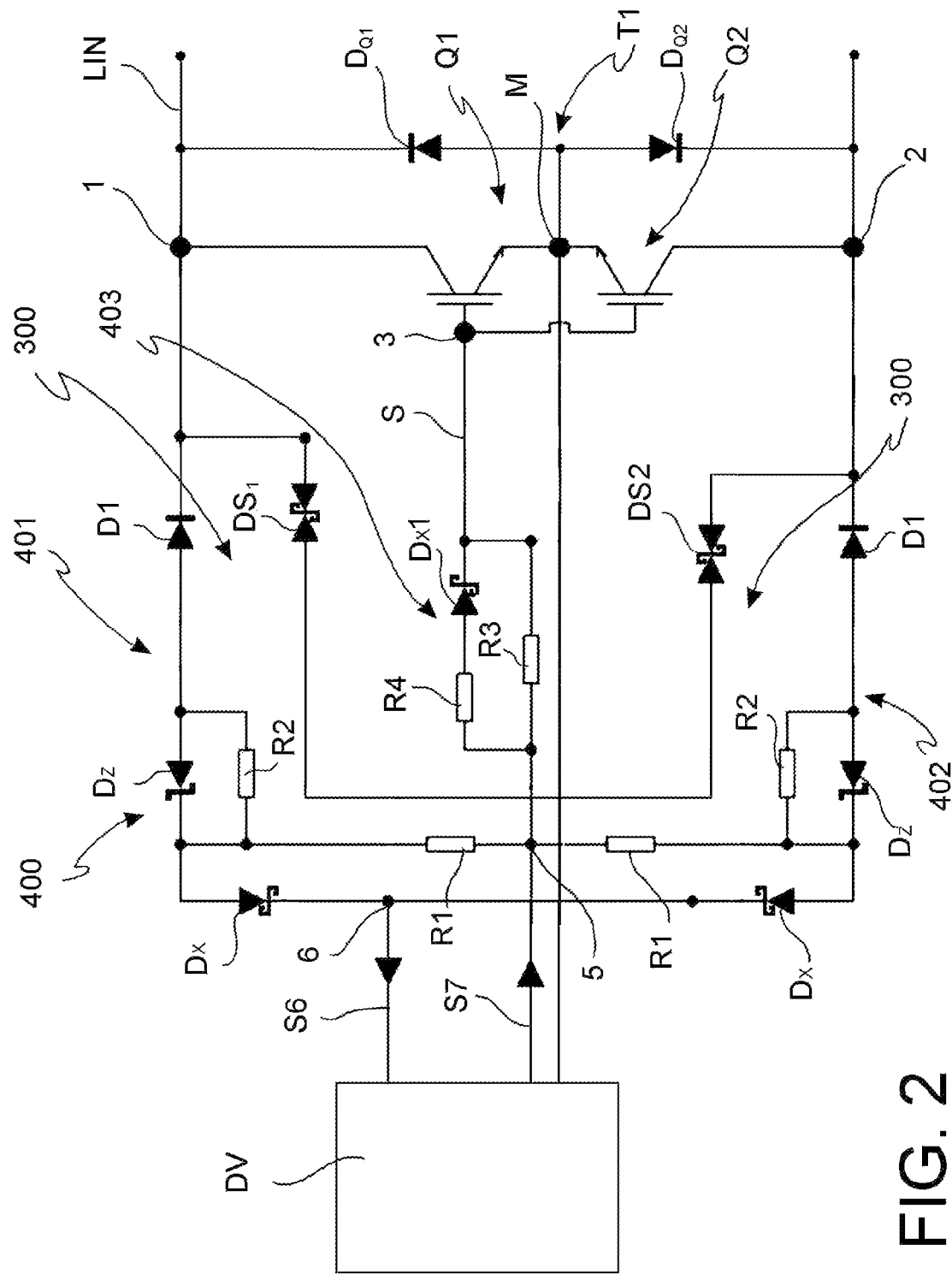
FIG. 2 is an exemplary wiring diagram of a portion of the circuit breaker of FIG. 1.

With reference to said FIGS. 1-2, reference numeral 100 globally indicates a circuit breaker for protecting an electrical system 10 from failures according to the present invention. In said FIGS. 1-2, elements and components which are equivalent or similar are indicated by the same reference numerals.

The circuit breaker 100 may be used for connecting a mains supply line LIN with one or more utility equipment or "loads" present in the system 10. It should be noted that such system 10 is preferably an industrial system comprising, in the example of FIG. 1, a single load LD supplied by the mains line LIN.

Such load LD represents any industrial electrical load, for example a heating resistance for furnaces for treating metals, ceramic, glass or a resistance of an infrared lamp.

Moreover, the circuit breaker 100 of the invention may be adapted to be connected to a mains supply line in alternating current either of the single-phase type or a three-phase line. With reference to the example of FIG. 1, the mains supply line LIN, hereinafter also referred to as mains line or simply line, is a single-phase line comprising two electrical conductors or wires, that is, an electrical phase wire L (or first phase L') and an electrical neutral wire N (or second phase L"). For example, such mains line LIN is configured for operating at voltages in alternating current AC in the range between 480 Vac and 600 Vac and with nominal currents in the range 25 A-250 A.

Moreover, it should be noted that the mains supply line LIN is characterised by inductive effects schematised in the above FIG. 1 by a first L1 and a second L2 inductance. For example, a maximum inductance value of line LIN is about $(L1+L2)_{max}=1000$ H and a minimum inductance value of line LIN is, for example, $(L1+L2)_{min}<100$ H.

In the following description, the term electrical system refers to system 10 comprising the electrical load LD, the mains supply line LIN and the same circuit breaker 100. For example, among the failures that may impair the correct operation of the electrical system 10, in the following description reference shall be made to the short-circuits that may affect load LD, the mains line LIN or the same breaker 100.

The circuit breaker 100 of the invention comprises a switching element T1, in particular a semiconductor power device, having a first 1 and a second 2 electrical terminal connected to the mains supply line LIN and a respective control terminal 3.

Such switching element T1 may be controlled by a control signal S applied to the control terminal 3. In more detail, the switching element T1 may be controlled for switching between an open status and a closed status for connecting the load LD to the mains line LIN subsequent to enabling such control signal S. On the contrary, the switching element T1 may be controlled for switching from a closed status to an open status for disconnecting load LD from the mains line LIN subsequent to a disabling of such control signal S.

With reference to the example of FIG. 2, the switching element T1 comprises, for example, a first Q1 and a second Q2 insulated gate bipolar transistor or IGBT substantially equal to each other. Such first Q1 and second Q2 IGBT transistor have respective emitter terminals connected to each other and to a reference terminal M, and gate terminals connected to the above control terminal 3. Moreover, a collector terminal of the first IGBT transistor Q1 is connected to the first electrical terminal 1 of the switching element T1 and a collector terminal of the second IGBT transistor Q2 is connected to the second electrical terminal 2.

It should be noted that such first Q1 and second Q2 IGBT transistors are provided, in parallel, with a first $D_{Q1}$ and a second $D_{Q2}$ diode for recirculating the reverse current, respectively.

The circuit breaker 100 further comprises a piloting circuit or drive DV adapted to enable/disable the generation of the control signal S applied to the control terminal 3 for controlling the switching element T1. In particular, such drive DV is configured for enabling said control signal S based on a logical activation signal Sa generated by a central control unit of the circuit breaker 100, for example a microprocessor, not shown in FIG. 1. It should be noted that drive DV is of the conventional type and shall not be described in more detail hereinafter.

The above central control unit of the circuit breaker 100 is adapted to control drive DV through a two-input logical port AND 202, wherein a first of such inputs is adapted to receive the above logical activation signal Sa.

In addition, the circuit breaker 100 of the invention comprises a current limiting circuit 200 operatively associated with the mains supply line LIN configured for detecting current variations in such line.

In one embodiment, such current limiting circuit 200 comprises a current sensor 201, preferably a Hall effect sensor. Such Hall effect current sensor 201 is connected in output to an electronic circuitry 204 comprising, for example, an amplifier and a comparator for generating a first logical signal S1 to send to drive DV subsequent to the detection of a current value on line LIN indicative of a failure in system 10, in particular a short-circuit. In other words, the current sensor 201 is adapted to detect an abnormal increase in the current of line LIN caused by the short-circuit hereinafter referred to as failure current or short-circuit current Icc. Such short-circuit current may also reach peak values of about 800 A.

For example, the Hall effect current sensor 201 used is insulated from the wires of line LIN and ensures a direct current (DC) bandwidth up to 100 kHz with response times of about 8 sec.

The first logical signal S1 is, in particular, provided on a second input of the logical port AND 202 for disabling, through a second digital signal S2, the generation of the control signal S by the drive DV by switching the semiconductor switching element T1 from the closed status to the open status for disconnecting the load LD from the mains line LIN.

It should be noted that the first logical signal S1 is also provided on an input SET of a memory circuit made with a flip-flop 203 of the SR type after having undergone a logical negation. A second input RES (reset) of flip-flop 203 is adapted to receive the same logical activation signal Sa sent by microprocessor to the drive DV through a dynamic coupling network adapted to execute a derivative on the positive edge of the activation signal Sa for generating a respective reset signal of flip-flop 203. Such dynamic coupling network is implemented, for example, with a capacitor C.

An output of flip-flop 203 is adapted to pilot the drive DV through a third logical signal S3 sent to an input of an overheating safety circuit of terminals 1, 2 which shall be described hereinafter in detail. Such third signal S3 is also sent to the central control unit.

Moreover, the circuit breaker 100 of the invention advantageously comprises a voltage regulator circuit, schematically represented by blocks 300 and 400 of FIG. 1, configured for regulating the voltage present between the first 1 and the second 2 electrical terminal of the switching element T1 subsequent to a short-circuit failure in the system 10. In particular, it should be noted that the circuit breaker 100 comprises a high voltage circuitry portion operating, for example, at the voltage of about 600 Vac, schematically enclosed by the dashed rectangle HV, which comprises blocks 300 and 400 of the voltage regulator and the switching element T1. The portions of breaker 100 outside rectangle HV are, on the other hand, at low voltage, for example at voltages of less than about 24V.

With reference to FIG. 2, there is described below an exemplary wiring diagram of the high voltage circuitry portion HV of the circuit breaker 100.

Such voltage regulator of breaker 100 advantageously comprises dissipation means 300 of a residual electrical energy stored on the mains line LIN, in particular in the first L1 and in the second L2 inductance, subsequent to a switching of the switching element T1 from the closed status to the open status caused by the detection of a failure or short-circuit current Icc. Such energy of the mains line LIN to be dissipated may reach values, for example, of about 80 Joules (or 450 KW) if the maximum inductance of line LIN is about 1000 H.

In one embodiment, such dissipation means 300 of electrical energy, and of a corresponding overvoltage present between the first 1 and the second 2 electrical terminal, comprise a first DS1 and a second DS2 energy dissipation circuit, substantially equal to each other. Such first and second dissipation circuits are a first DS1 and a second DS2 voltage transient suppressing diode connected to each other in a series. The serial connection of the first DS1 and of the second DS2 diode is connected in parallel to the semiconductor switching element T1 between said first 1 and second 2 electrical terminal. Such first DS1 and second DS2 diode are configured for operating two-directionally for activating, i.e. conducting, when the alternating voltage present between the first 1 and the second 2 electrical terminal exceeds a maximum voltage value applicable to the switching element T1. In particular, subsequent to the activation of said diodes DS1, DS2, the voltage drop on the first DS1 and on the second DS2 conducting diodes allows the maximum collector-emitter voltage applied on the first Q1 and on the second Q2 IGBT transistor respectively, to be fixed, protecting the switching element T1 from the short-circuit overvoltage between the first 1 and the second 2 electrical terminal.

It should be noted that each of said first DS1 and second DS2 voltage transient suppressing diode is characterised by response times of less than about 1 picosecond, being able to dissipate peak values having a power of about 30 KW. Moreover, it should be noted that each of the energy dissipation circuits described above may comprise a larger number of similar voltage transient suppressing diodes, for example at least a third diode connected in series to the first diode DS1 and at least a fourth diode connected in series to the second diode DS2.

Moreover, the circuit breaker 100 of the invention advantageously comprises means 400 for detecting a failure voltage generated between the first 1 and the second 2 terminal by a peak value of the failure or short-circuit current Icc subsequent to the switching off of the switching element T1.

Such failure voltage may reach, for example, values of about 5-9 V and it typically occurs at inductance values of line LIN of less than about 100 H. In particular, once the switching off of the switching element T1 has started (switching from closed status to open status) subsequent to the detection of the short-circuit current Icc, the failure voltage detection means 400 are configured for sending a logical failure signal S6 to the drive DV when such failure voltage has been detected. Based on such failure signal S6, the drive DV is adapted to generate a respective logical signal S7 for disabling the control signal S for keeping the switching element T1 in the open status removing current to load LD. In other words, in the case of a short-circuit, the function carried out by the voltage detection means 400 adds up to that of the limiting circuit 200 for accelerating the opening of the switching element T1.

With reference to the example of FIG. 2, such failure voltage detection means 400 comprise a first 401 and a second 402 electronic circuit respectively connected between the first electrical terminal 1 and an intermediate electrical terminal 5 connected to the drive DV and between the second electrical terminal 2 and the same intermediate electrical terminal 5.

In one embodiment, such first 401 and second 402 electronic circuits are substantially equal to each other. In particular, the first electronic circuit 401 comprises:

a first circuit portion proximal to the first electrical terminal 1 comprising a first diode D1, with the respective cathode connected to such first electrical terminal 1;

a second circuit portion proximal to the intermediate electrical terminal 5 comprising a first resistor R1;

an intermediate portion between said first and second portion comprising a Zener diode Dz connected in parallel to a second resistor R2; such Zener diode Dz has the respective anode connected to the anode of the first diode D1.

It should be noted that in addition, a second diode Dx, for example a Schottky diode, is connected to each of said first 401 and second 402 electronic circuit, in particular between the cathode of the Zener diode Dz and a common output terminal 6 of such circuits 401, 402. Such first 401 and second 402 electronic circuits cooperate for generating the above failure signal S6 on such common output terminal to be sent to the drive DV for disabling the control signal S.

In addition, the first portion of circuits 401, 402 may also comprise one or more diodes connected in series to the first diode D1.

Moreover, the intermediate electrical terminal 5 is connected to an electrical control network 403 arranged between such intermediate electrical terminal 5 and the control terminal 3 of the switching element T1 which, on the basis of the respective signal S7, disables the control signal S on the control terminal 3 switching the switching element T1 to the open status. In a preferred embodiment, the electrical control network 403 comprises a third resistor R3 connected in parallel to an electrical branch comprising a third diode Dx1, for example of the Schottky type, connected in series to a fourth resistor R4.

In one embodiment, with reference to FIG. 1, the circuit breaker 100 of the invention further comprises an overheating safety circuit 500, 600, 205 of the first 1 and second terminal 2 of the switching element T1 having a sensor portion operatively associated with at least one between such first 1 and second 2 terminal and a respective processing portion. In particular, the sensor portion is proximal to portions of terminals 1, 2 mechanically fixed, for example by screws, to the mains supply line LIN. Such terminal portions may be, for example, subject to increases in temperature by the Joule effect caused by sudden increases in the line current, or caused by a non conforming clamping of the electrical wires connected to the first 1 and to the second terminal 2.

The overheating safety circuit of the circuit breaker 100 comprises at least one temperature sensor 500, in particular two temperature sensors 500 are shown in the example of FIG. 1. Each sensor 500 is adapted to measure the temperature at the terminal portions mentioned above for providing a respective voltage signal St indicative of the temperature value measured to a comparator circuit 600. Such comparator 600 is configured for comparing said voltage signal St with a preset threshold voltage $V_{REF}$ for generating a fourth logical signal S4. Such fourth logical signal is sent to both the central control unit of circuit breaker 100 and on a second input of a port OR 205 for generating a fifth logical signal S5. If the temperature detected by sensors 500 corresponds to a voltage higher than the preset threshold value $V_{REF}$, the comparator 600 is adapted to disable, by the fourth logical signal S4 and the corresponding fifth signal S5, the drive DV and accordingly, the control signal S for switching the switching element T1 from the closed status to the open status.

TABLE 1 shows a summary of values (logical 0 and 1) that the above logical signals S1, Sa, S5, S2, S3 reach subsequent to the detection of an overcurrent caused by a short-circuit failure or the detection of an overheating at the first 1 and second 2 terminal.

TABLE 1

| signals | Normal operation T1 open | Normal operation T1 closed | Short-circuit current protection T1 open | Overheating protection T1 open |
|---|---|---|---|---|
| S1 | 1 | 1 | 0 | 1 |
| Sa | 0 | 1 | 0/1 | 0/1 |
| S5 | 0 | 0 | 1 | 1 |
| S2 | 0 | 1 | 0 | 0/1 |
| S3 | 0 | 0 | 1 | 0 |

In particular, when the enable signal Sa corresponds to a logical 0, i.e., the switching element T1 is kept off, the first signal S1 provided in output by the current limiter 200 takes the value of a logical 1. Such first signal S1 is a logical 1 also in the absence of short-circuit failures and the enable signal Sa is switched to a logical 1, i.e. the switching element T1 is switched to the closed status (in conduction) enabling the control signal S, i.e., the drive DV through the second signal S2 equal to 1. If a short-circuit is detected in the system 10, thus the detection of a current increase in line LIN, the first signal S1 takes the value of logical 0. In that case, irrespective of the value of the enable signal Sa, the second signal S2 takes the value of logical 0 for disabling the generation of the control signal S by the drive DV, i.e. switching the switching element T1 to the open status. Moreover, the third signal S3 in output from flip-flop 203 is a logical 1 similar to the fifth signal S5, irrespective of the temperature detected by the temperature sensors 500.

In the case of absence of short-circuits and with the switching element T1 operating and in the closed status, i.e. with the first signal S1 equal to 1 and with the third signal S3 equal to 0, the value of the fifth signal S5 depends on the temperature detected by sensors 500 at the electrical terminals 1 and 2. In that case, an increase in temperature beyond a predetermined value leads to a variation in said fifth signal S5 (from logical 0 to logical 1), based on the value taken by the fourth signal S4, for disabling the drive D1 disabling the generation of the control signal S. The circuit breaker 100 for protecting an electrical system 10 of the present invention exhibits several advantages.

In particular, such breaker 100 ensures a high protection of system 10 from hazardous current anomalies that may generate subsequent to short-circuits that affect load LD or the mains line LIN by promptly disconnecting the load LD from line LIN.

Moreover, the electronic dissipation circuits 300 of the residual electrical energy of line LIN and of failure voltage detection 400 advantageously allow protection of the semiconductor switching element T1 from transient overvoltage phenomena that occur together with short-circuits and that could cause hazardous overheating of the same switching element T1 or even irreparably damage it.

The circuit breaker 100 described above, moreover, is a device having an integrated and compact structure which compared to the known solutions does not need any complex outside action to restore the functionality subsequent to the occurrence of a transient failure.

In fact, after a transient short-circuit, the circuit breaker 100 is capable of self-resetting, i.e. of reconnecting the load LD to the mains line LIN autonomously and automatically by implementing a diagnostic procedure carried out by the central control unit. With such procedure, the central control unit proceeds executing a finite number of restoration attempts, for example five attempts, during which it sends the activation signal Sa of logical level 1 to the drive DV to enable the control signal S at a transition of the first logical signal 51 from logical 0 to 1.

Moreover, advantageously, the circuit breaker 100 of the invention is substantially exempt from temperature increases by Joule effect that may occur at the electrical terminals 1, 2 connected to the mains line LIN.

A man skilled in the art may make several changes, adjustments and replacements of elements with other functionally equivalent ones to the embodiments of a circuit breaker described above in order to meet incidental needs, without departing from the scope of the following claims. Each of the features described as belonging to a possible embodiment can be obtained independently of the other embodiments described.

The invention claimed is:

1. Circuit breaker for protecting an electrical system comprising a mains supply line (LIN) in alternating current, at least one electrical load (LD) and the circuit breaker, said breaker comprising:
    a semiconductor switching element (T1) having a first and a second electrical terminal connected to the mains supply line (LIN) and a control terminal, said switching element (T1) being controlled by enabling/disabling a control signal (S) applied to the control terminal for switching between an open/closed status and a closed/open status for connecting/disconnecting at least one load (LD) to/from said supply line (LIN);
    a drive (DV) adapted to enable/disable said control signal (S);
    a current limiting circuit operatively associated with the mains supply line (LIN) configured for sending a first signal (S1) to said drive (DV) for disabling said control signal (S) switching the switching element (T1) from the closed status to the open status subsequent to the detection of a current value (Icc) indicative of a failure in the system;
    a voltage regulator circuit connected to said first and second electrical terminal of the switching element (T1) comprising:
    dissipation means of a residual electrical energy stored on the mains supply line (LIN) subsequent to the switching of the switching element (T1) from the closed status to the open status due to the detection of said failure current (Icc),
    means for detecting a failure voltage between said first and second terminal generated by peak values of the failure current (Icc) at said switching of the switching element (T1) from the closed status to the open status, wherein said detection means are configured for sending a second signal (S6) to said drive (DV) for keeping said control signal (S) disabled, and
    wherein said means for detecting a failure voltage comprise a first and a second electronic detection circuit equal to each other, respectively connected between the first electrical terminal and an intermediate electrical terminal of the circuit breaker and between the second electrical terminal and the same intermediate electrical terminal, said intermediate terminal being operatively associated with the control terminal.

2. Circuit breaker according to claim 1, wherein said electrical energy dissipation means comprise a first (DS1) and a second (DS2) energy dissipation circuits equal to each other and connected in series to each other between the first and the second electrical terminal.

3. Circuit breaker according to claim 2, wherein each of said first (DS1) and second (DS2) dissipation circuit comprises at least one voltage transient suppressing diode.

4. Circuit breaker according to claim 1, wherein said first electronic detection circuit comprises:
    a first circuit portion proximal to the first electrical terminal comprising at least a first diode (D1),
    a second circuit portion proximal to the intermediate electrical terminal comprising a first resistor (R1);
    an intermediate portion between said first and second portion comprising a Zener diode (Dz) connected in parallel to a second resistor (R2).

5. Circuit breaker according to claim 4, wherein said first electronic detection circuit comprises a second diode (Dx) connected between a cathode of said Zener diode (Dz) and a common output terminal of said first (401) and second (402) detection circuit.

6. Circuit breaker according to claim 1, wherein said intermediate electrical terminal is connected to both said drive (DV) and to an electrical control network (403) arranged between the intermediate electrical terminal and the control terminal of the semiconductor switching element (T1).

7. Circuit breaker according to claim 6, wherein said electrical control network comprises a third resistor (R3) connected in parallel to a third diode (Dx1) and to a fourth resistor (R4), said third diode (Dx1) and fourth resistor (R4) being in series with each other.

8. Circuit breaker according to claim 1, wherein said current limiting circuit comprises a Hall effect current sensor.

9. Circuit breaker according to claim 1, wherein said semiconductor switching element (T1) comprises a first (Q1) and a second (Q2) insulated gate bipolar transistor or IGBT having the respective emitter terminals connected to each other and the gate terminals connected to said control terminal, the collector terminal of the first IGBT transistor (Q1) being connected to the first electrical terminal and the collector terminal of the second IGBT transistor (Q2) being connected to the second electrical terminal.

10. Circuit breaker according to claim 1, further comprising a logical port AND adapted to receive in input said first signal (S1) and an activation signal (Sa) for supplying a third signal (S2) to the drive (DV).

11. Circuit breaker according to claim 1, further comprising an overheating safety circuit of said first and second electrical terminal that comprises:
    a temperature sensor operatively associated with at least one between said first and second electrical terminal of the switching element (T1) for detecting a temperature of said at least one terminal and generating a corresponding voltage signal (St);

an electronic comparator adapted to receive said voltage signal (St) indicative of the temperature value detected for comparing it with a preset threshold voltage ($V_{REF}$);

a logical port OR adapted to receive a respective signal (S4) from the comparator for disabling the control signal (S) through the drive (DV) if the temperature detected by the sensor corresponds to a voltage higher than the threshold value ($V_{REF}$).

12. Circuit breaker according to claim 11, comprising a memory circuit having a first input (SET) for receiving said first negated signal (S1), and a second input (RES) for receiving a derivative of a positive edge of said activation signal (Sa), an output of the memory circuit being connected to a second input of said logical port.

* * * * *